June 17, 1958     N. GUIDA     2,838,864
OPTICAL DISPLAY DEVICE HAVING POLARIZING MEANS
Filed Aug. 12, 1953
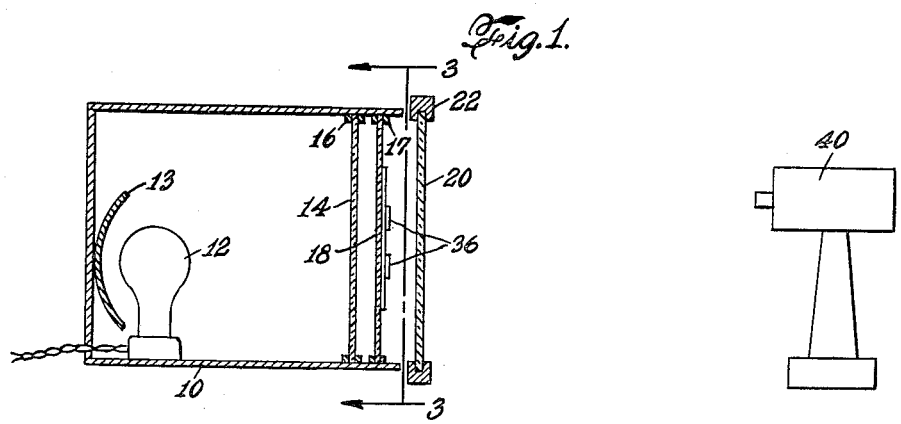
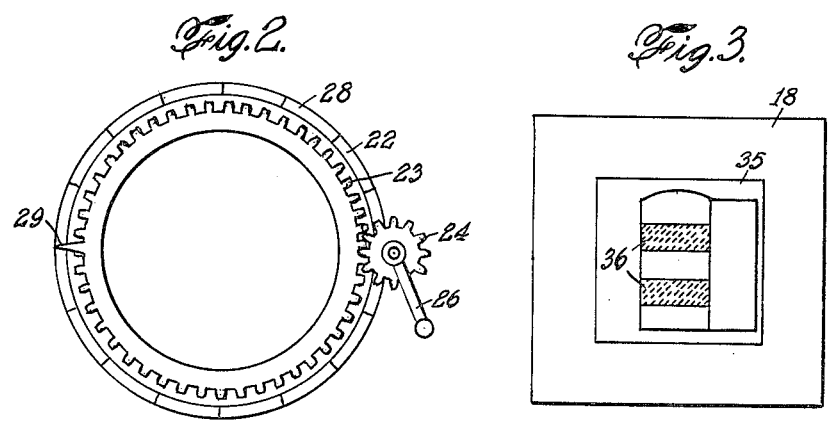

United States Patent Office 2,838,864
Patented June 17, 1958

2,838,864

OPTICAL DISPLAY DEVICE HAVING POLARIZING MEANS

Nicholas Guida, Great Neck, N. Y., assignor, by mesne assignments, to Visa-Matic Corporation, New York, N. Y., a corporation of New York Application August 12, 1953, Serial No. 373,833

1 Claim. (Cl. 40—130)

This invention relates to an optical viewing system employing polarized light and is more particularly concerned with a system for creating novel lighting effects in the viewing of photographic images.

In the use of advertising displays for transmission via television it is often desirable to show selected portions of a scene at a given time. For example, in a view of a room containing an appliance which is the object of the television "commercial" it is frequently desired to accent the view of the appliance and to subdue the surroundings. At the present time this can only be done by employing a large number of photographic reproductions of the scene, each varying from the other, and bringing the several views together on a motion picture film. The motion picture film is then televised to provide the viewer with the desired effect. While the use of motion pictures in connection with the "commercial" is not in itself objectionable, although it does not make possible the benefits obtainable with a "live" broadcast, the use of multiple still images and the preparation and treatment of the still images and their later assembly and reproduction on motion picture film is expensive and time consuming and requires the services of many skilled technicians and, as a result, greatly adds to the cost of the advertising display. Moreover, the display must of course be fully prepared well in advance of the broadcast and once it has been reproduced on the motion picture film it cannot be changed without having to repeat the entire lengthy procedure. There has, therefore, been a serious need for a system which will give the desired effects without the long preparatory techniques heretofore required and which will make it possible to apply advertising displays involving photographic images with varying lighting effects in a "live" broadcast.

It is an object of the present invention to provide an optical viewing system for creating novel lighting effects in lighted photographic images.

It is another object of the invention to provide an optical viewing system which makes possible the selective lighting of portions of a photographic or other image.

It is a further object of the invention to provide a system of the character indicated which is adapted to present to view an image for photographic reproduction, for television, or the like, and to make possible the concurrent selective changing of the lighting of selected portions of the image being viewed at will.

It is another object of the invention to provide an optical viewing system which avoids the disadvantages and drawbacks of the systems and procedures heretofore employed for the presentation to view of continuously-varying lighting effects in a photographic or like image.

It is a further object of the invention to provide an optical viewing system which will provide a lighted image and will make possible the variation of the lighting on selected portions of the image during a live television broadcast.

In accordance with the invention I provide an optical viewing system of the character above mentioned which comprises, for use in combination with a source of light, a photographic transparency, a light polarizing body positioned between the transparency and the source of light, a light polarizing body positioned on the other side of the transparency, and double refracting or so-called bi-refringent material overlying selected portions of either side of the transparency. One of the polarizing bodies is arranged for rotational movement in its plane relatively to the other polarizing body and may be arranged for manual or mechanical rotation.

It is a feature of the invention that rotation of one of the polarizing bodies through a relatively small arc will gradually vary the lighting of the transparency and that, by reason of the presence of the bi-refringent material on selected areas of the transparency, there will be contrasting lighting effects which will vary as the light polarizing body is rotated to emphasize any desired portion of the transparency at will.

Other objects and features of the invention will be readily apparent from the following detailed description of an illustrative embodiment thereof and from the accompanying drawing, wherein, Fig. 1 is a sectional view of a viewing arrangement embodying features of the present invention, showing the relative arrangement of parts and illustrating one embodiment merely by way of example;

Fig. 2 is a front view of the arrangement shown in Fig. 1 showing the manner in which one of the light polarizing elements may be constructed for manual or mechanical rotational movement;

Fig. 3 is a view of the arrangement as seen from behind the rotatable light polarizing element as indicated by the line 3—3.

Referring to the drawing, and more particularly to Fig. 1, the reference numeral 10 designates generally a case in which the elements of the viewing system are conveniently arranged and held in position. At the rear of the case 10 is a light source 12 which may be a conventional incandescent lamp of any convenient power, e. g. 100 watts. Behind the bulb 12 is a reflector 13, which may be parabolic or of other convenient form, for directing the rearward rays from the bulb toward the front of the case 10. Since, for best results, it is desirable that the light rays be somewhat diffused, a diffusing sheet or plate 14 which may be so-called "frosted" glass or the like, is placed in the path of the rays and is held in position near the front of the case 10, as by a frame 16. In front of the diffusing sheet 14 is positioned a polarizing element 18 also suitably held in a second frame 17. The light polarizing element 18 may comprise a sheet of a light polarizing material such, for example, as a sheet of material sold under the name Polaroid, and suitably formed for example, of the material described in U. S. Patent 1,918,848. This material may comprise a set suspending medium with a plurality of polarizing bodies immovably embedded in it with their polarizing axes oriented to be in substantial parallelism. The light polarizing element 18 may also be in the form of a transparent carrier provided with a coating of optically oriented crystalline light polarizing material such as the coating described in U. S. Patent 2,087,795. A second light polarizing element 20 is spaced from element 18 and substantially parallel thereto and is suitably mounted, as in a frame 22, for rotational movement. For this purpose the frame 22 may be provided with gear teeth 23 which mesh with a pinion 24 provided with a turning arm 26 which may be manually actuated or which may be suitably connected to a small motor (not shown) for imparting the desired rotational movement to it. To facilitate movement of the element 20 to a desired position, a graduated scale 28 is advantageously positioned adjacent the frame 22 for cooperation with a pointer 29 carried by the frame.

Disposed between the two polarizing elements 18 and 20 is a transparency 35, such as a colored or black and white photographic transparency, formed by any of the well-known processes commonly employed and carrying an image to be placed in view for reception by a television camera or motion picture camera, or the like. For most purposes the standard transparency may be used directly. When a colored image is to be received by a television camera, however, it may be necessary to retouch the transparency slightly by recoloring any portions which appear too dark when transmitted by television. It is well known that certain colors are transmitted as dark tones by television and that it is desirable to change these colors, by bleaching and/or dyeing the necessary areas of the transparency, to those colors and shades which are transmitted in lighter tones if optimum clarity and definition is to be obtained.

Associated with the transparency and overlying one of its sides are one or more strips 36 of a double-refracting (bi-refringent) material. Particularly suitable as bi-refrigerant material is regenerated cellulose known commercially as "cellophane" and for ease of application there is advantageously used a cellophane strip coated on one side with a pressure sensitive adhesive by means of which the strip may be applied to the transparency. While cellophane is the preferred bi-refringent material, it will be apparent that other materials having like action upon plane polarized light may also be employed, for example, mica. The strips of bi-refringent material are applied to the portions of transparency which it is desired to emphasize and set apart from the background. In the illustrative embodiment shown in Fig. 3, for example, the transparency carries the image of an open refrigerator, showing the various areas of the interior delineated by the shelves. If in the display of the transparency image in a television commercial, for example, it will be desired to emphasize at some point the areas delineated by the top and bottom shelves, then the bi-refringent strips are applied over these areas. Each bi-refringent strip is placed in a position such that it will transmit maximum light when the two polarizing bodies 18 and 20 transmit minimum light. For example, when the two parallel bodies are placed with their polarizing axes in parallel relationship, and then rotated to a point of minimum light transmission, the axes of the bi-refringent material are positioned in the relationship to give maximum light transmission. The strip when so positioned is then cut to the exact size of the area of the portion of the transparency to be covered.

When the device is used, the light rays from the lamp 12 pass through the first light polarizing element 18, then through the transparency and, when present, the bi-refringent material, and finally through the second polarizing element 20 to the eyes of the viewer or to the device which is to receive the image projected, such as the television camera 40 shown in Fig. 1, or a motion picture camera, or the like. When the axes of the polarizing elements 18 and 20 are parallel, the light passes uniformly through to the viewer and all of the transparency is equally illuminated. When, however, it is desired to emphasize the portion of the transparency which is covered by the bi-refringent material, the polarizing element 20 is slowly rotated for a few degrees of arc either in a clockwise or in a counter-clockwise direction. The portions where the bi-refringent material is present will be brightly illuminated while the remainder of the transparency will gradually darken until it is almost invisible. It will thus be possible, merely by a slight rotation of the polarizing element 20, to blank out the background and yet show the desired portion of the transparency in full illumination, and the complicated techniques previously employed to obtain this effect are completely avoided.

It will be apparent that various changes and modifications may be made in the embodiment of the invention, specifically shown and above described, by way of example, without departing from the scope of the invention as defined in the appended claim. For example, the rear polarizing element 18 rather than the forward polarizing element 20 may be the one which is rotatably mounted. All of the strips of bi-refringent material do not have to be aligned in the same direction with respect to the axes of the polarizing elements but may be differently aligned so that different portions of the transparency are selectively illuminated against a dark background as rotation of the rotatable polarizing element is effected. Various other changes and modifications in addition to those mentioned will be readily apparent to those skilled in the art and it is intended, therefore, that all matter contained in the foregoing description and shown in the drawings shall be interpreted as illustrative only and not in a limiting sense.

What I claim and desire to secure by Letters Patent is:

An attraction causing device for emphasizing certain significant parts only of a photographically-produced image, wherein said image is alternately brightly illuminated in its entirety and then virtually obscured in all but said certain parts while leaving said certain parts brightly illuminated to display said significant parts of said composite image; said device consisting of a lamp box having an open end, a lamp in said box, a first sheet of polarizing material, means fixedly mounting said first sheet across said open end, a second sheet of polarizing material parallel to and spaced from said first sheet and disposed across said open end, said second sheet being rotatable relatively to the first sheet, means for imparting predetermined rotational movement to said second sheet, a diffusing screen mounted in said lamp box and disposed between said lamp and the sheet nearest to said lamp, a positive photographically-produced transparency disposed between said sheets of polarizing material, said transparency carrying said photographically-produced composite image thereon, and a single layer of bi-refringent material covering said certain parts only and the remainder of said composite image on said transparency being free of said bi-refringent material, a rigid transparent member fixedly supporting said transparency and said bi-refringent material across said open end, the axis of said bi-refringent material being positioned relatively to the plane of polarization of the sheets of polarizing material to transmit maximum light through those parts of the composite image covered by the bi-refringent material and through the member and sheets when the axes of said sheets of polarizing material are arranged at 90° with respect to one another, whereby when the polarizing sheets are arranged with their axes parallel, the light passes uniformly through all parts of the composite image and through the member and sheets and the entire composite image is equally illuminated, and whereby when the polarizing sheet is gradually rotated until the polarizers are crossed, the parts of the photographic image not covered by the bi-refringent material become gradually invisible while said significant parts to be emphasized stand out brightly in gradually increasing contrast to the parts of the image being rendered virtually invisible.

References Cited in the file of this patent

UNITED STATES PATENTS

| | | |
|---|---|---|
| 2,393,968 | Burchell et al. | Feb. 5, 1946 |
| 2,393,969 | Burchell et al. | Feb. 5, 1946 |
| 2,458,437 | Smith | Jan. 4, 1949 |
| 2,482,410 | Gaetjens | Sept. 20, 1949 |
| 2,494,543 | Clarke | Jan. 17, 1950 |
| 2,511,010 | Rohr | June 13, 1950 |
| 2,558,605 | Coutant et al. | June 26, 1951 |
| 2,578,420 | Goodale et al. | Dec. 11, 1951 |
| 2,603,129 | Dreyer | July 15, 1952 |

OTHER REFERENCES

Thompson: Text on Light, published by Macmillan Co., London, 1897, pages 147, 148.